Patented Aug. 8, 1939

2,168,336

UNITED STATES PATENT OFFICE 2,168,336

CELLULOSIC STRUCTURE AND METHOD FOR PRODUCING SAME

Winfield Walter Heckert, Ardentown, Del., assignor, by mesne assignments, to E. I. du Pont de Nemours & Company, Wilmington, Del., a corporation of Delaware No Drawing. Application June 17, 1936, Serial No. 85,816. In Germany June 18, 1935

24 Claims. (Cl. 8—57)

This invention relates to the manufacture of cellulose derivative materials and especially cellulose acetate materials, such as yarns, threads, filaments, fibers and the like or fabrics made therefrom, or other structures such as films, pellicles, caps, bands or the like which will have improved affinity for direct dyestuffs.

Direct dyestuffs are easily applied to textile materials and since they possess the property of dyeing cotton, linen, regenerated cellulose as well as wool and silk, they form a very important class of coloring matter. Direct dyes, in general, are dischargeable which is an important characteristic and is usually necessary for the manufacture of an important class of textile fabrics known as print goods.

Cellulose derivative structures and especially the cellulose esters, such as cellulose acetate, are dyed only with expensive dyestuffs and by means of special, expensive and difficult procedures. For the most part, none of the cellulose acetate dyes are satisfactorily dischargeable and normal cellulose acetate structures cannot be dyed with direct dyes. It is because of this property that cellulose acetate has been used to a considerable extent where cross dyeing effects are desired, but on the other hand, when cellulose acetate is mixed with regenerated cellulose, cotton, wool or natural silk and uniform, solid color is desired, it has been necessary to go through a long, expensive procedure attended by undesirable changes in the yarn or fabric properties.

An object of this invention is to improve the affinity of cellulose derivative structures and especially cellulose esters, such as cellulose acetate structures, for direct dyestuffs.

Other objects will be apparent from the description that follows:

This invention is characterized by the incorporation of an amino polymer in the cellulosic material in any suitable manner. The amino polymers which are contemplated as coming within the scope of this invention are all substantially insoluble in water and in 5% aqueous ammonia, but soluble in 2% aqueous acetic acid. The amino nitrogen may be primary, secondary or tertiary, part of an open chain or of a cyclic molecular structure.

The amino polymers which may be introduced into cellulosic structures to improve their affinity for direct dyestuffs may be subdivided into several groups as follows.

1. The first group, closely related to though nevertheless distinct from cellulose, may be considered as hexose amine polymers, or more broadly as carbohydrate amine polymers which have, where necessary, been purified and converted into the acid soluble type. With or without such treatments, the highly polymeric molecule is built up by nature and the amino nitrogen, as a rule is present in the natural product. Those in which the nitrogen is present in the substance as it exists naturally may be of marine or insect origin on the one hand, or vegetable origin on the other. Deacetylated chitin, which is by far the best example of a hexose amine polymer is, for example, of marine origin, and the polymers obtained from fungi such as *Aspergillus niger* are of vegetable origin. Examples of carbohydrate amine polymers in which the highly polymeric molecule has been built up by nature, but into which the amino nitrogen has been introduced synthetically are the alkylamino celluloses. Regardless of the source of the nitrogen, this first group also includes various reaction products and chemical derivatives of carbohydrate amine polymers, provided of course that they have the required solubility characteristics.

2. The second group of amino polymers comprises that group of synthetic resins, in the making of which ammonia in some instances and monomeric amino nitrogen containing bodies in others have been employed. This group is distinct in that the highly polymeric molecules are built up wholly by artificial means, i. e. they are not synthesized by nature. The resins of this group may be considered broadly as those which contain amino nitrogen and have the requisite solubility characteristics. The following types of resins are illustrative of the classes among which highly polymeric amino nitrogen containing bodies falling in this classification may be found.

(a) Resinous polymeric amino alcohol esters of acrylic acid and of its homologues substituted in the alpha position by a hydrocarbon radical, and (b) resinous reaction products of phenols, aldehydes and ammonia or primary or secondary amines.

(a) Examples of the first of the above subclasses of resins are beta-diethylaminoethyl alpha-methacrylate, beta-piperidyl-N-ethyl-alpha-methacrylate, and beta-dicyclohexyl aminoethyl alpha-methacrylate. These resins may be prepared by spontaneous polymerization of the monomeric compounds, but for the purposes of the present invention, advantage can be taken of a unique property of the monomers, namely their ability to form polymerizable salts with aqueous acids. The monomer as prepared may simply be dissolved in the stoichiometrical amount or more of aqueous acid and the solution heated with a polymerization catalyst such as benzoyl peroxide until polymerization of the salt is effected.

(b) An example of the second of the above subclasses of resins having amino nitrogen and the specified solubilities is the reaction product of meta-cresol, formaldehyde and dimethylamine. Other phenols such as phenol itself or p-tertiary amyl phenol may be substituted for the cresol, and the ammonia or various primary or secondary amines for the dimethylamine. It is desirable in most cases, possible in all cases, and necessary in some cases, to react the amine or ammonia with a part of the formaldehyde before adding the remainder. These resins are to be sharply distinguished from the phenol-aldehyde resins prepared in the presence of only catalytic amounts of ammonia or amines, which resins cannot be employed in accordance with the methods of this invention because they lack the preponderance of amino nitrogen which induces the proper solubility characteristics. The molal ratio of amine to phenol which is used in making the resins with which the present invention is concerned is on the order of 1:2.

3. The third group of amino nitrogen containing polymers included in this invention consists of protein derivatives containing sufficient amino nitrogen to make them comply with our solubility requirements. Examples are piperidylmethyl zein, dimethylaminomethyl zein, and diethylaminomethyl zein. These products may be made in one way as follows. The zein is first suspended in water or dissolved in about 75% alcohol, preferably the latter. To the alcohol solution is added aqueous formaldehyde, a secondary amine and sufficient alcohol to keep the concentration at about the original figure. The mixture is allowed to stand or may be heated gently until it becomes soluble in acetic acid, 6-18 hours, depending on temperature, usually being required. The final product, in order to be acid soluble, should have at least 8-10% basic amino nitrogen. The maximum obtainable is around 22% and the products having the high percentages are the most desirable for use in the present invention.

An example of a particularly suitable carbohydrate amine polymer is substantially undegraded, at least partially deacetylated chitin. Chitin is the essential constituent of horny exoskeletons of crabs, lobsters, shrimp and other crustacea, as well as of certain insects such as locusts, grasshoppers and the like. Certain vegetable sources are also available, as for instance fungi such as *Aspergillus niger*.

Chitin is thought to consist of acetylated amino cellulose and in order to render it soluble in dilute acetic acid, it has to be treated so as to remove at least some of the acetyl groups. In order that the treated chitin may be capable of being converted into a useful product, the deacetylation should be sufficiently mild so that the polymeric chitosamine molecule be not substantially degraded.

Preferably from 0.2 to 0.9, and particularly from 0.7 to 0.86 of the nitrogen in the deacetylated chitin employed is in the form of free amino groups.

Suitable deacetylated chitin may be prepared by digesting purified chitin with alkali under conditions which preclude substantial degradation. The extent to which chitin may thus be deacetylated is governed by the concentration of the caustic alkali, the temperature and time of treatment, the particle size, density and previous treatment of the chitin. Caustic alkali concentrations of from 5% to 60% by weight may be used, the time and temperature of the reaction being adjusted in accord with the caustic alkali concentration used. The higher the concentration the lower should be the temperature and/or the shorter the time of treatment. With 5% caustic soda at 150° C. about 24 hours are required to reach a soluble stage; with 50% caustic soda at 100° C. only 1 hour's treatment is necessary, while with 40% caustic soda at 100° C. about 18 hours are required to reach the same degree of deacetylation.

The viscosity of solutions of deacetylated chitin in aqueous acetic acid is also a measure of the extent of degradation during the deacetylation treatment. Generally speaking, it is desirable that the process be controlled in such a way that the viscosity of a 5% solution of the product in aqueous acetic acid of the necessary concentration shall not be less than one poise. The viscosities of such solutions of deacetylated chitin obtained by treating chitin at a temperature of 100° C. for various periods of time with 50.9% sodium hydroxide are given in the following table:

| Time of treatment | Viscosity |
| --- | --- |
|  | *Poises* |
| 1 hr | 630 |
| 2½ hrs | 63 |
| 6 hrs | 46 |
| 16 hrs | 36 |
| 48 hrs | 11 |

The viscosity of solutions of deacetylated chitin of given concentration in the equivalent or a given excess of acetic acid may be decreased by the addition to the solution of oxidizing agents such as hydrogen peroxide, chlorine, bromine, hypochlorous acid, perborates, permanganates, bichromates, oxygen, air, etc. Thus, the addition of 20 parts per million of 30% hydrogen peroxide reduces the viscosity from 568 to 213 poises in one hour, or from 510 to 80 poises in three hours, but no further drop in viscosity is observed after three weeks. The viscosity may also be altered by allowing one of the above described oxidizing agents to act upon the solid material, i. e., prior to dissolving in acetic acid.

The viscosity of the material, when dissolved in acetic acid, may be increased by heating the solid material before dissolution. Thus, on heating one batch of deacetylated chitin in the solid state for 12 hours at 100° C., the viscosity of a 5% solution in aqueous acetic acid was raised from 5 to 100 poises.

EXAMPLE A

Crude chitin (e. g., crab shells) was first purified by alternate treatment with 1% soda ash at boiling temperature and with 5% hydrochloric acid at ordinary temperature until the material was free from lime salts and adherent protein. The pure chitin thereby obtained was then digested with 40% sodium hydroxide at 110° C. for about 4 hours under conditions which substantially exclude oxidation. The deacetylated chitin thus produced was soluble in aqueous acetic acid, for example, in the proportion of 161 grams of deacetylated chitin to 48 grams of acetic acid, dissolved in the amount of water required to give the desired viscosity.

Since deacetylated chitin is essentially a substance which, although highly polymeric, contains a large percentage of its nitrogen in the form of primary amino groups, it would be expected to form salts with acids, and this presumably is what occurs when acids are employed for conversion of the product to the form in which it is to be used in making the coating compositions of the present invention. Evidence for salt formation is that the product requires the stoichiometrical amount of acetic acid, for example, before complete solution takes place. While reference will be made hereinafter to these solutions in acid as acid solutions of the polymeric amino nitrogen containing body or as solutions of the acetate, propionate, etc., depending on the acid employed, it is not desired to be confined in the appended claims to a theory of salt formation. Most of the "salts" described herein (which may if desired be prepared with more than a stoichiometrical amount of acid and thus may contain an excess thereof) are water soluble. Thus, the acetate, benzoate, formate, lactate, maleate, adipate, citrate, glutamate, isobutyrate, and under certain circumstances the hydrochloride of deacetylated chitin are readily soluble; the succinate, phthalate and hypochlorite are, however, only slightly soluble; others such as the oxalate, salicylate, and linoleate, are even less soluble; and the sulfate is relatively insoluble.

The preparation of various amino polymers is fully discussed in a number of copending applications such as for instance Rigby United States Patent No. 2,040,879 relating to the preparation of deacetylated chitin; Graves application Serial No. 21,807, filed May 16, 1935, relating to polymeric amino alcohol esters of alpha substituted acrylic acid; Harmon application Serial No. 21,810, filed May 16, 1935, relating to polymeric salts of amino alcoholic esters of alpha substituted acrylic acid; Meigs application Serial No. 59,643, filed January 17, 1936, relating to amino proteins; Hardy United States Patent No. 2,136,296, relating to amino cellulose soluble in dilute acetic acid; Haskins United States Patent No. 2,136,299, relating to alkyl amino celluloses soluble in at least a stoichiometrical amount of 5% aqueous acetic acid; Balthis United States Patent No. 2,122,707, relating to the resin prepared by reacting vinyl ketone polymers such as methyl vinyl ketone with ammonia or a primary amine; and Greenewalt United States Patent No. 2,063,158, relating to hydrogenating ketone resins in the presence of ammonia or a primary or secondary amine; reference is also made to United States Patent No. 2,098,869 of Harmon and Meigs, relating to amine phenol formaldehyde resins.

To further illustrate the preparation of a few of these amino resins the following examples are given.

EXAMPLE B.—*Beta-diethylaminoethyl methacrylate*

This compound is made by dissolving 117 grams (1 mol) of beta-diethylaminoethanol and 400 grams (4 mols) of methyl methacrylate in 300 grams of dry benzene containing 30 grams p-phenylene diamine, and heated in an oil bath under a 48" fractionating column fitted with a distilling head arranged for controlled reflux and distilled until all the moisture present in the reagent has been removed. Beta-diethylaminoethyl methacrylate is isolated by collecting the fraction boiling at 85±5° C. at 5 mm. pressure, carefully washing 8 times with cold water to remove traces of p-phenylene diamine, drying with anhydrous magnesium sulfate, filtering, washing the drying agent with ether, combining the washings with the bulk of the product and then distilling the ether under reduced pressure in an atmosphere of nitrogen. The monomeric ester is left in the distilling glass as an almost colorless liquid which polymerizes spontaneously to a tough, transparent, pale amber polymer. When allowed to stand at room temperature or even at a lower temperature, the polymer was insoluble in water and in the common oxygenated organic solvents, soluble in acetone.

EXAMPLE C

To a solution of 200 ccs. of formalin (37% aqueous formaldehyde) containing 1 gram of potassium carbonate, there is added 250 ccs. piperidene while the mixture is cooled with tap water. This methylolpiperidene solution is then added to a mixture of 1,500 ccs. of methanol, 75 ccs. of water, and 250 grams of zein. The solution was mixed thoroughly with mechanical agitation and allowed to stand over night. It was centrifuged to remove insoluble materials and then concentrated in vacuo. The concentrated solution is poured into a large volume of water which results in the precipitation of the reaction product, which is washed several times by decantation and then finally pressed out and dried as rapidly as possible through the aid of a hot air blast in an oven at 50° C. The material is ground to a fine powder as soon as it is dry, the yield of piperidyl methyl zein being 239 grams. This material is readily soluble in dilute aqueous acetic acid, but insoluble in water or dilute ammonia solutions.

EXAMPLE D

Fifty grams of polymeric methyl vinyl ketone are dissolved in 250 grams of dioxan and agitated overnight with 50 grams of cyclohexylamine. A test showed that the resin was not readily soluble in dilute acids; hence, the reaction mixture was heated in a steam bath for 5 hours. The resin was then precipitated. By pouring the reaction mixture in water and after standing 12 hours in fresh water, it was filtered and dried in vacuo. The yield was 55 grams. The pulverized resin was soluble to the extent of 4 grams in 96 grams of 5% aqueous solution of acetic acid.

EXAMPLE E

A solution of 18 grams (0.4 mol) of dimethylamine in 32.4 grams (0.4 mol) of 37% aqueous formaldehyde was added with mechanical stirring and cooling to 53.5 grams (0.5 mol) of 88% phenol. To the above mixture, a solution of 81 grams (1 mol) of 37% aqueous formaldehyde and 30.4 grams (0.5 mol) of 28% aqueous ammonia was added with cooling. The resulting solution was gradually heated in a water bath to 90° C. and held at that temperature for 5 hours. The resulting resin was purified by grinding it to a uniform slurry in the presence of a little water in an ice cold mortar, followed by filtration and washing with ice cold water. After drying, it weighed 74 grams. It was a yellow material which softened slightly above room temperature. It was soluble in acetone, ethyl acetate, dioxan, 10% aqueous sodium hydroxide, 1.5% aqueous acetic acid, 3% formic acid, and 90% toluene-10% ethanol mixture.

There are of course numerous other amino polymers that can be prepared in much the same way as will be apparent from a study of the applications specifically referred to above, such as for instance beta-dimethylaminomethyl methacrylate; beta-dicyclohexylaminoethyl methacrylate; beta-di-N-butylaminoethyl methacrylate; beta-morpholine-N-ethyl methacrylate; piperidyl aminoethyl methacrylate; triethanolamine monomethacrylate; dimethylaminomethyl zein; diethylaminomethyl zein; dibutylaminomethyl zein; piperidyl methyl glycinin; dimethylaminomethyl gliadin; dimethylaminomethyl casein; the polymerization product resulting by reacting polymeric methyl vinyl ketone with concentrated ammonium hydroxide or with amines such as cyclohexylamine; glucamine, ethanolamine, ethylene diamine; the reaction product between phenol, formaldehyde, ammonia and dimethylamine; between phenol, lignin, formaldehyde and dimethylamine; between phenol, formaldehyde and dimethylaminomethanol; between phenol, formaldehyde and dimethylol cyclohexanolamine; between phenol, formaldehyde, ammonia and aniline; and many others.

Instead of simple polymers, interpolymers may be prepared, for instance by reacting methyl methacrylate and methyl vinyl ketone in the presence of ammonium hydroxide or reacting beta-cyclohexylaminoethyl methacrylate monomer and beta-dimethylaminoethyl methacrylate monomer together under suitable conditions. Other equivalent polymeric materials such as copolymers may also be used, provided their solubility characteristics are as previously set forth.

In carrying out the instant invention, these polymers are incorporated in the cellulose derivative material, such as cellulose acetate in any suitable manner, as for instance by dissolving or dispersing the polymer in the cellulose acetate spinning solution, or by dissolving or dispersing the polymer in a suitable solvent or dispersing medium, impregnating the cellulose acetate material with this solution or dispersion and removing the solvent or dispersing medium.

The following examples are given to illustrate the principles of this invention, it being understood of course that the invention is not limited to these precise examples which are merely illustrative of the invention.

EXAMPLE I

Deacetylated chitin prepared according to Example A is dissolved in a 5% acetic acid to form a solution containing 3% deacetylated chitin and this solution heated to 50° C. A small skein of cellulose acetate yarn is soaked in this solution for 5 minutes, then removed, the excess solution drained therefrom and the yarn placed in 5% aqueous ammonium hydroxide at room temperature for 5 minutes and then dried at room temperature. The yarn so treated, when dyed in the manner described immediately below, showed good affinity for direct dyestuffs. If desired, the drying of the deacetylated chitin treated yarn may precede the ammonia treatment.

The yarn to be dyed is soaked in an aqueous bath containing 0.5% sodium oleate soap and 0.5% sodium carbonate heated to from 70°–80° C. for 15 minutes. The yarn is rinsed with water and permitted to drain for a few minutes, after which it is immersed in a dye bath. The dye bath is made up by dissolving a direct color, such as Pontamine Scarlet B, color index 382, in water to form a 0.2% solution of dye and then 25 ccs. of this solution, 0.75 grams of sodium sulfate, and 2 grams of 10% acetic acid are dissolved in 175 ccs. of water, the solution heated to 40° C., and a 5 gram sample of yarn immersed therein. The temperature of the solution is raised to boiling and boiled for 15 minutes, at which time 2 grams of 10% acetic acid are added and then the boiling continues for another 15 minutes, when 2 grams of 10% acetic acid are again added. The boiling is continued another 15 minutes, the sample removed, rinsed and dried.

EXAMPLE II

The beta-diethylaminoethyl methacrylate prepared according to Example B is dissolved in acetone and to this solution sufficient cellulose acetate is added to form a spinning solution containing 20% cellulose acetate, 4% polymer and 76% acetone. The solution spun electrically, for example, in the method set forth in Formhals Patent No. 1,975,504 and the yarn so produced dyed in the same manner as described under Example I, using either Pontamine Scarlet B or Pontamine Blue RW, color index 512. The yarn so produced has good physical properties and shows good affinity for direct dyestuffs.

EXAMPLE III

The polymer produced according to Example C is dissolved in 4% acetic acid to form a solution containing 4% of the polymer. The solution is heated to 50° C. and a small bunch of cellulose acetate staple fibers is soaked in this solution for 5 minutes, then removed, the excess solution drained therefrom and the yarn placed in a 5% ammonium hydroxide water solution, at room temperature for 5 minutes, rinsed and dried at room temperature. The fibers so treated are tested in the manner described under Example I and were found to have taken the direct dye exceedingly well.

EXAMPLE IV

The resin prepared according to Example E was dissolved in a cellulose acetate spinning solution to the extent of 10%, based on the cellulose acetate present. The cellulose acetate solution prior to the addition of the resin comprises 15% cellulose acetate in a solvent composed of 97% acetone and 3% water. The spinning solution containing the resin dissolved therein was dry spun in the usual manner. A skein of this yarn, when dyed in the manner described under Example I, showed a decided affinity for direct dyes and was comparable in uniformity and depth of color to wool yarn dyed in the same manner.

EXAMPLE V

The resinous polymer prepared according to Example D above was dissolved in 5% acetic acid to the extent of 2% resin. The solution was heated to 60° C. and a small piece of cellulose acetate fabric immersed in a solution where it was allowed to remain for about 5 minutes. The fabric was removed, the excess solution drained therefrom and then placed in a 5% ammonium hydroxide water bath at room temperature for 5 minutes. At the end of this time the sample was removed, rinsed with water and dried at 40° C. The fabric so treated showed a remarkable improvement in affinity for direct dyestuffs as compared with cellulose acetate which had not been treated.

Example VI

An interpolymer prepared by the condensation of 65% dicyclohexyl amino ethyl methacrylate monomer and 35% dimethyl amino ethyl methacrylate monomer is dissolved in a mixture of ethylene dichloride and isopropyl alcohol and into this solution cellulose acetate is dissolved to form a solution containing:

|  | Parts by weight |
|---|---|
| Cellulose acetate | 15 |
| Ethylene dichloride | 70 |
| Isopropyl alcohol | 30 |
| Interpolymer | 3 |

The solution is spun electrically in the manner described in United States Patent 1,975,504. A sample of the fibers so produced when dyed in the manner described under Example I showed good affinity for direct dyes.

It will be apparent from the foregoing examples that these polymeric amino nitrogen containing bodies may be incorporated in the cellulose acetate structures in many ways. If the resin is incorporated in the solution from which the cellulose acetate structure is formed, it is generally desirable to add a higher concentration of resin to the solution, based on the cellulose acetate content, than is added to the bath in which the cellulose acetate materials are after-treated.

If the polymer is to be added to the spinning solution, concentrations as high as 30% or even more, based on the weight of the cellulose acetate present may be used. In general, however, I find that concentrations ranging from 2 or 3% up to about 20%, depending of course on the effectiveness of the specific materials chosen, are sufficient for most purposes. While it is possible to increase the depth of dyeing by the addition of still larger quantities of the polymer, the increased depth of dyeing is offset by weakening of the cellulose acetate structure, so that from the practical standpoint, it is advisable to use no more resin in the cellulose acetate structure than is necessary to obtain the depth of color desired.

Where the resin is to be added to the cellulose acetate thread or the like by after-treatment, concentrations of resin in the solution which is impregnated in the cellulose acetate structure need be no more than about 10%. Very good results have been secured with as little as 1% and generally, it is not necessary to increase the concentration over 5 or 6%.

It is preferred of course to select a resin which will be soluble in a suitable solvent according to the process to be used. For instance, if the material is to be incorporated in a cellulose acetate spinning solution, a resin should be selected which is soluble in acetone, acetone-alcohol mixtures, or other solvent or solvent mixture for cellulose acetate. In some cases, it is possible to use resins which are dispersed rather than dissolved in the spinning solution.

In some instances, it may be desirable to incorporate the resin forming material or the monomer in the cellulose acetate structure and to form the resin in situ. This is a desirable procedure, especially where the resin to be used is insoluble in a suitable solvent, but where the resin forming materials or the monomer is soluble in a suitable solvent.

If desired, the dye may be dissolved in the treating bath containing the amine polymer, the monomer or the resin-forming materials and the cellulose derivative structure treated in a single bath. Also, the dye may be incorporated in the cellulose derivative solution along with the amino polymer or the like and colored structures produced therefrom.

This invention is of primary interest in connection with cellulose esters, and more particularly cellulose acetate although other cellulose esters, such as cellulose propionate, cellulose butyrate and the like can be produced of improved dyeing characteristics by incorporating therein one or more of the resins or polymers referred to in this case. Quite probably, cellulose ethers, such as benzyl cellulose, ethyl cellulose, methyl cellulose, glycol cellulose, etc., whether in the form of threads, films or other form may be endowed with improved dyeing properties when treated in accordance with the teachings of this invention.

The dyes which have been disclosed hereinbefore are merely illustrative of the class of dyes known as direct dyestuffs and any other dyes generally classified as direct dyes may be substituted with substantially equivalent results.

It is apparent that this invention considerably widens the range of dyestuffs available for use with cellulose acetate and other cellulose esters. It enables the dyer to use a new class of dyes which can be easily applied, which are relatively cheap and which will produce uniform colors fast to light, washing, and other factors tending to affect the color. Furthermore, since these resins are of high molecular weight, they are slow to diffuse from the fiber and since they are generally of film forming materials, they do not tend to weaken the fiber to the extent the fibers would be weakened by incorporating therein low molecular weight substances such as monomers. Also, these materials have a further advantage for this use in that they are definitely not volatile and water insoluble and therefore resist removal by heat or washing.

By means of this invention cellulose acetate threads may be mixed with wool, cotton, regenerated cellulose or the like and satisfactory dye results secured with direct dyes. Furthermore, fabrics made from 100% cellulose acetate yarn are simply and inexpensively dyed with direct dyestuffs and dischargeable printing may be carried out with very good results.

Parts and proportions referred to are parts and proportions by weight unless otherwise specified.

Since it is obvious that many changes and modifications can be made in the above described processes and products without departing from the nature and spirit of the invention, it is to be understood that the invention is not to be limited except as set forth in the appended claims.

I claim:

1. The process which comprises dyeing with a direct dyestuff an organic cellulose derivative structure containing an amine polymer which is insoluble in water and in 5% aqueous ammonia and soluble in 2% aqueous acetic acid said polymer having the property of increasing the affinity of said structure for said direct dyestuff.

2. The process which comprises dyeing with a direct dyestuff a cellulose ester structure containing an amine polymer which is insoluble in water and in 5% aqueous ammonia and soluble in 2% aqueous acetic acid said polymer having the property of increasing the affinity of said structure for said direct dyestuff.

3. The process which comprises dyeing with a direct dyestuff a cellulose acetate structure containing an amine polymer which is insoluble in water and in 5% aqueous ammonia and soluble in 2% aqueous acetic acid said polymer having the property of increasing the affinity of said structure for said direct dyestuff.

4. The process which comprises dyeing with a direct dyestuff an organic cellulose derivative structure containing deacetylated chitin.

5. The process which comprises dyeing with a direct dyestuff a cellulose ester structure containing deacetylated chitin.

6. The process which comprises dyeing with a direct dyestuff a cellulose acetate structure containing deacetylated chitin.

7. The process which comprises dyeing with a direct dyestuff an organic cellulose derivative structure containing a resinous polymeric amino-nitrogen containing body which is insoluble in water and in 5% aqueous ammonia and soluble in 2% aqueous acetic acid said body having the property of increasing the affinity of said structure for said direct dyestuff.

8. The process which comprises dyeing with a direct dyestuff a cellulose ester structure containing a resinous polymeric amino-nitrogen containing body which is insoluble in water and in 5% aqueous ammonia and soluble in 2% aqueous acetic acid, said body having the property of increasing the affinity of said structure for said direct dyestuff.

9. The process which comprises dyeing with a direct dyestuff a cellulose acetate structure containing a resinous polymeric amino-nitrogen containing body which is insoluble in water and in 5% aqueous ammonia and soluble in 2% aqueous acetic acid said body having the property of increasing the affinity of said structure for said direct dyestuff.

10. The process which comprises dyeing with a direct dyestuff an organic cellulose derivative structure containing a resinous polymeric amine derivative of protein which is insoluble in water and in 5% aqueous ammonia and soluble in 2% aqueous acetic acid said derivative of protein having the property of increasing the affinity of said structure for said direct dyestuff.

11. The process which comprises dyeing with a direct dyestuff a cellulose ester structure containing a resinous polymeric amine derivative of protein which is insoluble in water and in 5% aqueous ammonia and soluble in 2% aqueous acetic acid said derivative of protein having the property of increasing the affinity of said structure for said direct dyestuff.

12. The process which comprises dyeing with a direct dyestuff a cellulose acetate structure containing a resinous polymeric amine derivative of protein which is insoluble in water and in 5% aqueous ammonia and soluble in 2% aqueous acetic acid said derivative of protein having the property of increasing the affinity of said structure for said direct dyestuff.

13. An organic cellulose derivative structure containing an amine polymer which is insoluble in water and in 5% aqueous ammonia and soluble in 2% aqueous acetic acid, and a direct dyestuff said polymer having the property of increasing the affinity of said structure for said direct dyestuff.

14. A cellulose ester structure containing an amine polymer which is insoluble in water and in 5% aqueous ammonia and soluble in 2% aqueous acetic acid, and a direct dyestuff said polymer having the property of increasing the affinity of said structure for said direct dyestuff.

15. A cellulose acetate structure containing an amine polymer which is insoluble in water and in 5% aqueous ammonia and soluble in 2% aqueous acetic acid, and a direct dyestuff said polymer having the property of increasing the affinity of said structure for said direct dyestuff.

16. An organic cellulose derivative structure containing deacetylated chitin and a direct dyestuff.

17. A cellulose ester structure containing deacetylated chitin and a direct dyestuff.

18. A cellulose acetate structure containing deacetylated chitin and a direct dyestuff.

19. An organic cellulose derivative structure containing a resinous polymeric amino-nitrogen containing body which is insoluble in water and in 5% aqueous ammonia and soluble in 2% aqueous acetic acid, and a direct dyestuff said body having the property of increasing the affinity of said structure for said direct dyestuff.

20. A cellulose ester structure containing a resinous polymeric amino-nitrogen containing body which is insoluble in water and in 5% aqueous ammonia and soluble in 2% aqueous acetic acid, and a direct dyestuff said body having the property of increasing the affinity of said structure for said direct dyestuff.

21. A cellulose acetate structure containing a resinous polymeric amino-nitrogen containing body which is insoluble in water and in 5% aqueous ammonia and soluble in 2% aqueous acetic acid, and a direct dyestuff said body having the property of increasing the affinity of said structure for said direct dyestuff.

22. An organic cellulose derivative structure containing a resinous polymeric amine derivative of protein which is insoluble in water and in 5% aqueous ammonia and soluble in 2% aqueous acetic acid, and a direct dyestuff said derivative of protein having the property of increasing the affinity of said structure for said direct dyestuff.

23. A cellulose ester structure containing a resinous polymeric amine derivative of protein which is insoluble in water and in 5% aqueous ammonia and soluble in 2% aqueous acetic acid, and a direct dyestuff said derivative of protein having the property of increasing the affinity of said structure for said direct dyestuff.

24. A cellulose acetate structure containing a resinous polymeric amine derivative of protein which is insoluble in water and in 5% aqueous ammonia and soluble in 2% aqueous acetic acid, and a direct dyestuff said derivative of protein having the property of increasing the affinity of said structure for said direct dyestuff.

WINFIELD WALTER HECKERT.

CERTIFICATE OF CORRECTION.

Patent No. 2,168,336. August 8, 1939.

WINFIELD WALTER HECKERT.

It is hereby certified that error appears in the printed specification of the above numbered patent requiring correction as follows: Page 3, first column, line 47, for the words "amino collulose" read amino celluloses; and second column, line 19, for "200 ccs." read 220 ccs.; and that the said Letters Patent should be read with this correction therein that the same may conform to the record of the case in the Patent Office.

Signed and sealed this 19th day of September, A.D. 1939.

(Seal)

Henry Van Arsdale,
Acting Commissioner of Patents.